July 7, 1970  H. KAISER  3,519,777
DUAL POSITIONING MECHANISM FOR A ROTARY ELECTRIC SWITCH
WITH A LOST-MOTION COUPLING BETWEEN ROTORS
AND PARTICULAR DETENT MEANS
Filed Dec. 12, 1966  5 Sheets-Sheet 1

INVENTOR
HERMANN KAISER
BY
Burton & Parker
ATTORNEYS

July 7, 1970  H. KAISER  3,519,777
DUAL POSITIONING MECHANISM FOR A ROTARY ELECTRIC SWITCH
WITH A LOST-MOTION COUPLING BETWEEN ROTORS
AND PARTICULAR DETENT MEANS
Filed Dec. 12, 1966  5 Sheets-Sheet 3

INVENTOR
HERMANN KAISER
BY
Burton & Parker
ATTORNEYS

INVENTOR
HERMANN KAISER
BY
Burton & Parker
ATTORNEYS

INVENTOR
HERMANN KAISER
BY
Burton & Parker
ATTORNEYS

United States Patent Office 3,519,777
Patented July 7, 1970

3,519,777
DUAL POSITIONING MECHANISM FOR A ROTARY ELECTRIC SWITCH WITH A LOST-MOTION COUPLING BETWEEN ROTORS AND PARTICULAR DETENT MEANS
Hermann Kaiser, Detroit, Mich., assignor to Gemco Electric Company, Clawson, Mich., a corporation of Michigan
Filed Dec. 12, 1966, Ser. No. 601,162
Int. Cl. H01h 9/22, 3/50
U.S. Cl. 200—155  6 Claims

ABSTRACT OF THE DISCLOSURE

The disclosure relates to a dual positioning mechanism for a rotary electric switch including a first detent mechanism enabling positioning of the rotary switch at two or more circumaxially spaced apart locations and a second spring return mechanism for returning the rotary switch to an initial location.

This invention relates to positioning mechanism for rotary electric switches and in particular represents an improvement upon mechanism disclosed in U.S. Pat. 3,251,956 though it will be apparent to those skilled in the art that the positioning mechanism will have applications for other rotary electrical devices.

The positioning mechanism disclosed herein is of two types: first, a detent mechanism for enabling an operator of the switch to position it at two or more given positions of rotation to effect various open and closed conditions of the switch contacts and second, a spring return mechanism for automatically returning the switch contacts to a given open or closed condition after rotation of the selector knob to effect a different contact condition. The two types of positioning mechanisms may be used either alone or in combination with each other in association with a rotary electrical switch.

In general, it is an object of the invention, to provide rotary electric switch positioning mechanism of the foregoing two types adapted for use in a modular stack type rotary electric switch assembly of the general character disclosed in the aforementioned patent, and to avoid mispositioning of switch contacts, the positioning mechanism has been conceived and designed to be placed between the actuator assembly and the stack of switches.

With respect to the detent mechanism a number of specific objects are intended:

To eliminate any "double-index" feel and instead provide a positive "single" index feel;

To provide a positive snap feel which tends to automatically move the switch contacts to the proper position once the actuator knob has been turned a sufficient distance;

To provide a variable number of detent positions using the same parts with the mechanism being alterable in the field;

To provide for both a "30° index" as well as a "60° index" in the same mechanism with each being obtainable by an adjustment of the mechanism in the field;

To provide for continuous rotation in either direction.

With respect to the spring return mechanism, the following objects are intended:

To provide a spring return mechanism which will positively return the switch through 90° in either direction of rotation;

To provide a spring return mechanism which will spring return the switch in one direction but not in the other thereby allowing a "maintained position" when the selector knob is turned in one direction and a spring return action when the knob is turned in an opposite direction, or, stated more broadly, obtain a spring return action for only a portion of the predetermined angular travel of the selector switch;

To provide for positive stops on the rotation of the selector in either direction at various limits of angular travel;

And to provide a strong spring return in one direction and a light spring return in the other.

In addition to the foregoing objects, it is intended that the positioning mechanism be of extremely compact design and low cost with a high degree of reliability.

Other objects, advantages, and meritorious features will more fully appear from the specification, claims and accompanying drawings in which:

Figure 1:
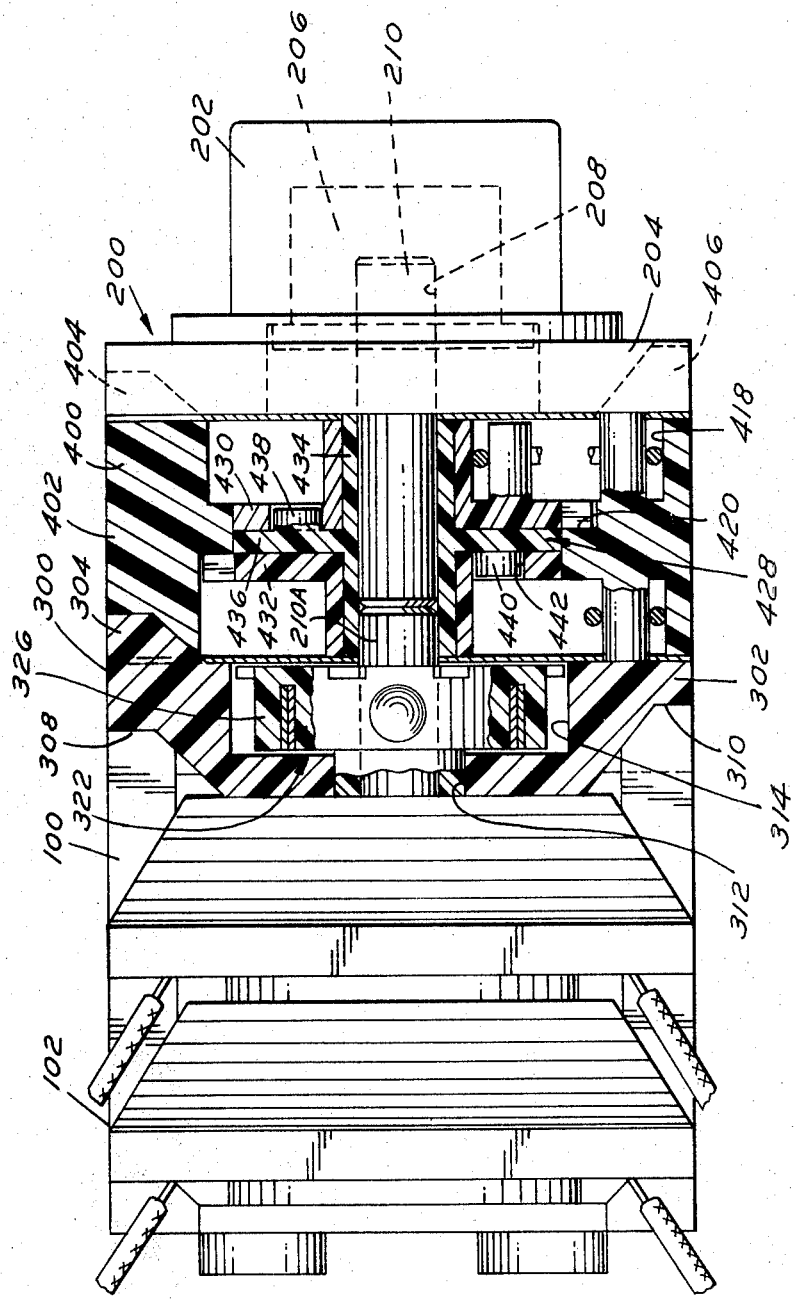
FIG. 1 is a side elevation partly in section of a modular rotary electric stack switch having both types of the switch positioning mechanism heretofore mentioned as well as two switch body assemblies.

As described in Pat. 3,251,956 the modulator rotary electric switch comprises three subassemblies: The switches themselves termed switch body assemblies, herein designated in the drawing by reference numerals in the 100 series, an actuator assembly designated in the drawings by reference numerals in the 200 series, and positioning mechanism designated in the drawings by reference numerals in the 300 and 400 series, and disposed in a stacked arrangement between the actuator assembly and the switch body assembly or assemblies.

Figure 2:
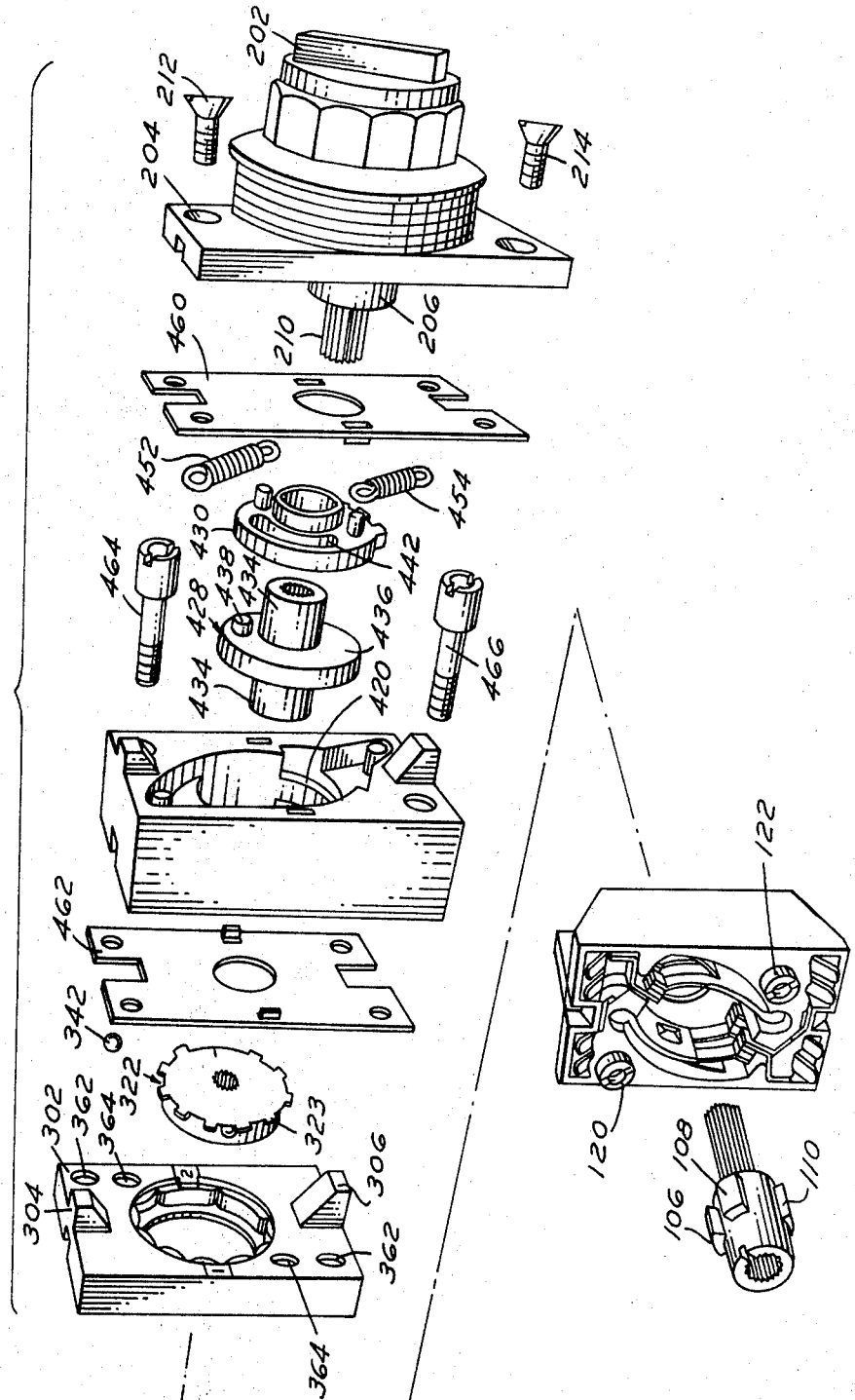
FIG. 2 is an exploded view of the switch and positioning mechanism of FIG. 1 except that only one of the switch body assemblies is shown.
Figure 3:
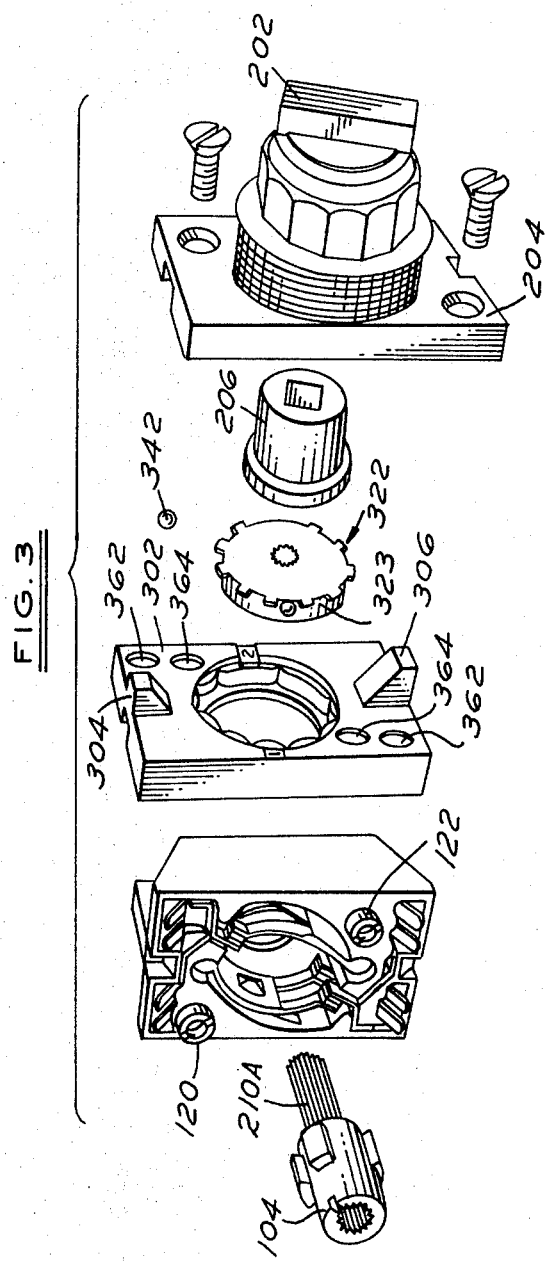
FIG. 3 is an exploded view of a rotary selector switch including the detent positioning mechanism and one switch body assembly.

In FIG. 1 a rotary modulator stack switch embodying the invention is disclosed which includes an actuator 200 having a selector knob 202 which is grasped by the fingers of the operator to be rotated, a spring return positioning assembly 400 juxtaposing the actuator assembly and operably connected thereto, a detent positioning assembly 300 juxtaposing the spring return assembly and operably connected thereto, and two switch body assemblies 100 and 102, secured to each other and to the detent assembly; the entire stack being operatively connected as hereinafter described. Construction details of the switch body assemblies and the actuator assembly are, for the most part, omitted herein as each is described in detail in the above mentioned patent. Suffice it to say that the actuator assembly includes a body number 204 upon which the selector knob 202 is mounted for rotation, the knob being provided with an internal part 206 (see FIGS. 2 and 3) which rotates with it and has a splined bore 208 within which a splined shaft 210 is received for rotation with the knob to drive and be driven by the same. The shaft extends into the positioning mechanism for operatively connecting the actuator assembly to the positioning mechanism. The shaft may comprise either a portion 210A of the contact shifting part 104 as shown in FIG. 3, or may be a separate structural part as shown in FIGS. 1 and 2.

The contact shifting part 104 upon rotation causes its cam surfaces, such as surfaces 106, 108 and 110, to move wtih respect to the movable contacts within the switch body assembly and effect an opening or closing of the contacts. Whether contacts are opened or closed upon a given rotation of the contact shifting part is dependent upon the location, number and shape of the cam surfaces on the part and the amount and direction of angular travel of the part, all as described in the aforesaid patent. A number of contact conditions can be obtained dependent upon the direction and amount that the selector knob 202 is turned. The detent mechanism serves to position the contact shifting part at predetermined positions to effect predetermined contact conditions and the snap action of the detent mechanism not only gives the operator a positive "feel" for the position of the knob, but also an audible signal, the snapping noise of the detent, as the knob rotates. The spring return mechanism will serve to return the selector knob and the contact shifting part from one or more positions to which it may have been turned by the operator.

Considering first the spring return mechanism 400, it includes a body member or housing 402, formed of any suitable material, such as Delrin. As shown in FIGS. 2, 3, 4, and 5, the housing is generally rectangularly shaped and is provided at its front face with a pair of forwardly projecting locating ears 404 and 406, ear 406 being somewhat larger than ear 404, with the ears receivable within suitably provided locating notches of complimentary size in the actuator body 204. The front and rear faces of the body are diagonally recessed at 418 and 422 with a spring retaining post at opposite ends of each recess, the posts being indicated at 408, 410, 412, and 414. A circular aperture 416 extends completely through the body coaxial with the center thereof. The diagonal recess 418 which opens through the front face of the housing includes an inwardly stepped portion 420 of an arc length of substantially 102°. Corresponding diagonal recess 422 is similarly provided with an inwardly stepped portion 424 of substantially 102° arc length. Opposite ends of such inwardly stepped portions, or notches, provide stop means for the rotor assembly to be described, and allow for limited relative rotation between the housing and the rotor assembly.

Rotatably received in the housing, and specifically within the circular aperture 416 is the rotor assembly 426 comprising a primary rotor 428 and at least one secondary rotor 430. When it is desired that the spring return mechanism return the switch from either direction of its rotated displacement, another secondary rotor 432 is also provided. The rotors are arranged coaxially, the primary rotor having a hub portion 434 internally splined as at 435 to receive the splined shaft 210 or the splined projection 210A of the contact shifting part 104. Intermediate opposite ends of the hub is a radially projecting flange 436 from the opposite faces of which and at 180° spacing project actuating ears 438 and 440, one for each face of the rotor.

The secondary rotor or rotors are rotatably mounted on the hub 434 of the primary rotor at opposite sides of and in juxtaposition with opposite faces of flange 436. Each sencondary rotor includes an arcuate slot 442 into which the ear 438 on the juxtaposed face of the primary rotor flange projects. The ear 438 and the slot 442, as shown particularly in FIG. 2, provide a lost motion coupling between the primary rotor and the secondary rotor 430 which allows limited independent relative angular travel between such rotors. The secondary rotor 432 is identical with the rotor 430 and the ear 440 and the slot 442 in the secondary rotor cooperate to provide a lost motion coupling between such secondary rotor and the primary rotor. The slots 442 in the secondary rotors are substantially 90° in effective arcuate length, i.e. will allow substantially 90° relative angular travel between the primary rotor and the secondary rotor, and a total of 180° maximum relative angular travel between the two secondary rotors.

Each of the secondary rotors is provided at its periphery with a plurality of radially projecting stop ears 446, 448 and 450 angularly spaced at 30° intervals. Each stop ear may exhibit a numeral or other indicia to facilitate identification by the electrcan in the field. It is apparent that by removing one or more of the stop ears the amount of rotation allowed a secondary rotor can be increased as the stop ears move within the slot 420 and 424.

Figure 4:
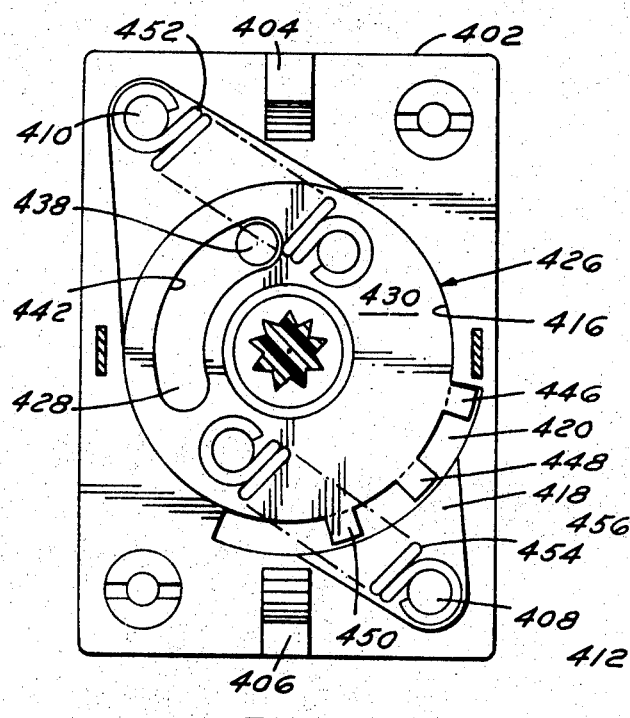
FIG. 4 and FIG. 5 are of opposite sides of a spring return positioning mechanism.
Figure 5:
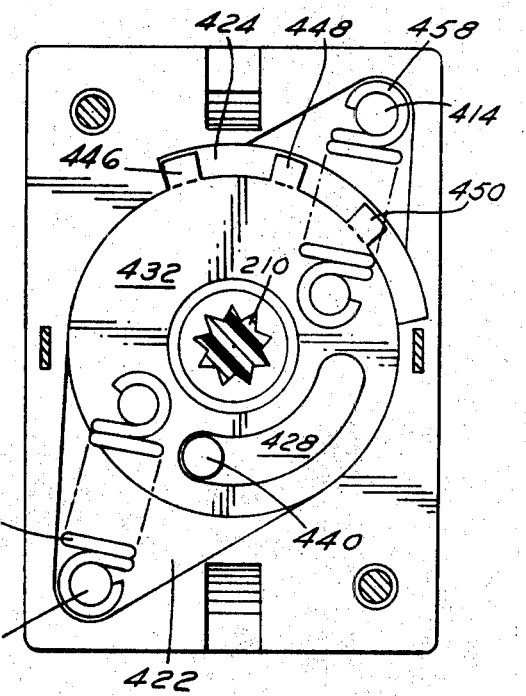
Figure 6:
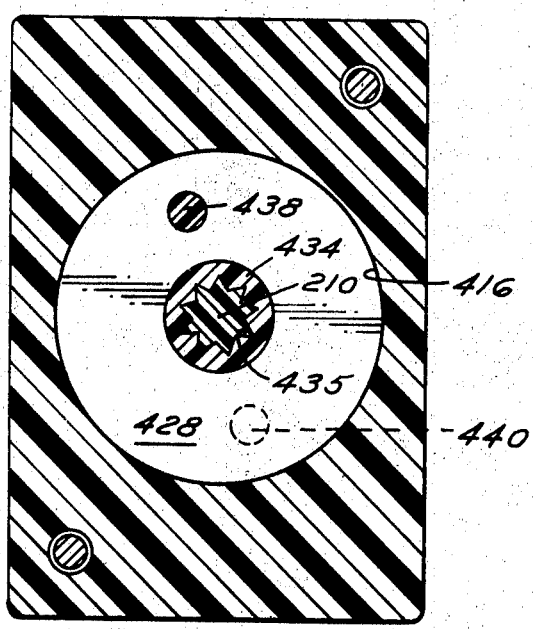
FIG. 6 shows the mechanism of FIG. 4 with two of the springs and the secondary rotor removed.

Spring means are provided in the housing for cooperation with the rotor assembly. Four springs 452, 454, 456, and 458 are shown in FIGS. 4 and 5, two being in each of the diagonal recesses. Less than four may be provided depending upon the requirements of the return mechanism. If only spring 452, or if both springs 452 and 454 are provided, then the spring return positioning assembly will only return the selector knob when it is turned by the operator clockwise (as viewed in FIGS. 2 and 4) beyond the limit of relative angular travel between the primary and secondary rotor 432 allowed by the lug 438 in the slot 442. It will be observed in FIG. 4 that the primary rotor 428 and secondary rotor 432 are at one limit of their allowed relative angular travel, and that further clockwise rotation of rotor 428 will stretch springs 452 and 454. The primary rotor may be rotated 30° until stop ear 450 of the secondary rotor engages the left-hand end of the notch 420, at which point further rotation of the primary rotor is prevented. Release of the selector knob will allow springs 452 and 454 to rotate both rotors conjointly counterclockwise back to the position shown in FIG. 4.

From the consideration of FIGS. 4 and 5 it will be apparent that if springs 456 and 458 were omitted, rotation of the selector knob (and consequently the primary rotor) in a couterclockwise direction (as viewed in FIG. 4) from the position shown, would be free of any spring return action and this gives rise to a switch which will have a spring return function in one direction of selector knob rotation, and a "maintained position" when rotated in the opposite direction. The amount of clockwise, or counterclockwise rotation is determined by the number of the stop ears 446 etc. that are left on the secondary rotors. If a greater amount of rotation is desired, one or more of the ears may be removed by cutting or otherwise suitably removing them from the secondary rotor. It will be apparent from a study of FIGS. 4 and 5 that a number of possible combinations of permitted rotor rotation, and spring return action, are available using the parts shown simply by removing springs and/or stop ears. It is also apparent that these various possible spring return effects, when combined with the various possible relative angularly related positions that the primary rotor and the splined shaft 210A may be connected, give rise to a great number of possible contact conditions and sequence and type of contact operation.

It will now be apparent from the foregoing description that the spring return positioning mechanism provides for positive angular spring return of the selector knob and contact shifting part in each switch body assembly up to 90° in either a clockwise or counterclockwise direction, or both, and the spring return action is also possible for only a portion of the predetermined total angular travel of the contact shifting part 104 by the proper relative angular connection between the contact shifting part and the rotor assembly. It will also be aparent that "maintained" and spring return positions within a total angular travel of 180° of selector knob movement are possible with this mechanism.

A pair of cover plates 460 and 462 are provided for closing opposite faces of the body member 402. The body member is held to the actuator assembly 200 in the following fashion. A pair of screws 464 and 466 are received in the body member and are adapted to be threaded into the body 302 of the detent positioning assembly 300. Each of the screws is provided with an enlarged head portion which is internally threaded to receive screws 212 and 214 of the actuator.

The detent positioning mechanism 300 includes the body portion 302 which is provided on its front face with a pair of forwardly projecting lugs 304 and 306 receivable in complimentary notches formed in the rear face of the spring return mechanism or the actuator assembly, depending upon whether a spring return mechanism is utilized. The rear face of the body member 302 is provided with notches 308 and 310 for receiving locating ears on the front face of the juxtaposed switch body assembly 100.

Coaxial with the body member 302 in axial alignment with the spline shaft 210 and the contact shifting part 104 is an aperture 312 opening through both the front and rear face of the body member. The aperture is provided with a counterbore 314 which opens through the front face. The peripheral wall of the counterbore is shaped to define a plurality of radially inwardly extending cam surfaces, best shown in FIG. 8, at least two of which, 316 and 318, have an effective arcuate length of substantially 60° each, while the other cam surfaces 320 have an effective arcuate length of substantially 30°. These cam surfaces are arranged at the periphery of a rotor assembly 322 received in the counterbore. The rotor assembly includes a rotor 323 having a circular front wall 324 rearwardly from which extends an annular coaxially arranged wall 326 and a somewhat diamond-shaped hub 328, having opposite sides 330 and 332 disposed closely adjacent to the inner surface of the annular wall 326.

Figure 8:
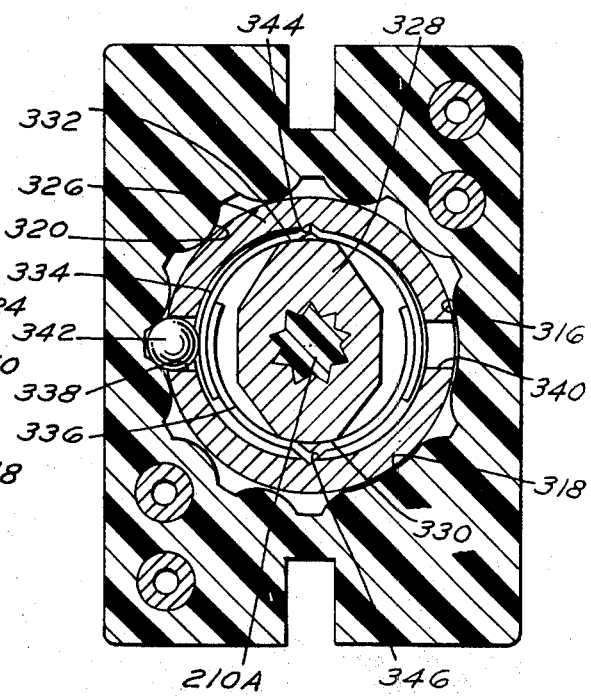
FIG. 8 is a view similar to FIG. 7 but with a portion of the rotor cut away for clarity.
Figure 9:
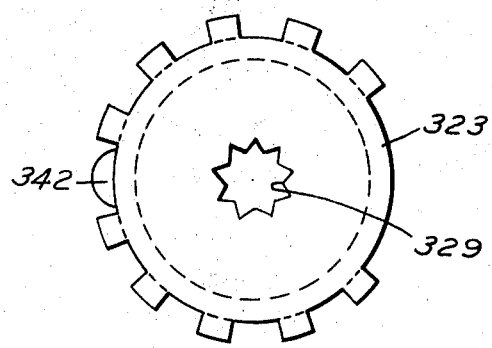
FIG. 9 is a plan view of the detent rotor shown in FIGS. 7 and 8.

Received within the annular wall 326 under outward spring tension is leaf spring means in the form of a pair of arcuately shaped leaves 334 and 336, opposite ends of which overlap as shown in FIG. 8. The rotor is also provided with means at a plurality of locations about its periphery for receiving and supporting a detent which is urged radially outwardly by the spring means. Such detent receiving and supporting means comprises, as shown in FIG. 8, a pair of ball receiving apertures 338 and 340 which are disposed at 180° locations. The leaf springs bear against a ball detent 342 which may be disposed alternatively in either of the apertures, and the springs urge the ball radially outwardly toward and into engagement wtih the cams. The hub 328 is provided with an internal splined through aperture 329 within which and through which extends the projection 210A of the contact shifting part 104. The inner surface of the wall 326 is provided adjacent and opposite the faces 330 and 332 of the hub, with notches 344 and 346 within which dimples of the leaf springs are received to prevent displacement of the springs within the rotor.

Figure 7:
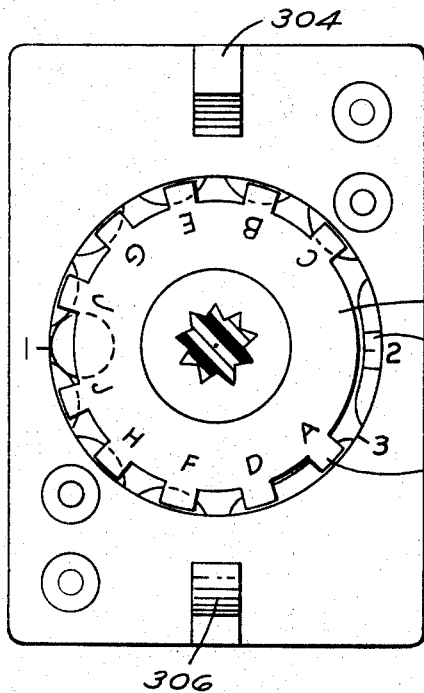
FIG. 7 is a front elevation of the detent positioning mechanism.

The front wall 324 of the rotor is provided with a plurality of radially extending stop tabs 348 which may be identified by suitable indicia, such as the letters shown in FIG. 7. The body member or housing is provided with a stop ear 350 with which the stop tabs 348 cooperate to limit rotation of the rotor. These stop tabs may be cut off or otherwise removed from the rotor to vary the amount of permitted angular travel of the rotor.

From a study of FIGS. 7 and 8 it will be noted that with the ball detent 342 in the position shown, and with the stop tabs as shown, the rotor may be moved either clockwise or counterclockwise through 30° of angular travel. It will be obvious that if stop tabs 348 at one or both sides of the stop ear 350 is removed, the rotor may be moved a greater distance by additional 30° steps. It will also be apparent that if the rotor is removed from the housing and the ball detent 342 repositioned in the aperture 340, and the rotor reinserted in the housing in the same position, it may be rotated through an angular travel of 60° between two positions. By the removal of certain stop tabs 348 it will be noted that a three position switch having a 60° index between positions, may be obtained.

The rotor assembly 322 is supported by the crests of the lobes or cams 316, 318 and 320 for rotation in the housing, and the shape and slope of the lobes is such that a good snap action and positive positioning are attained, and the ball detent will tend to roll into the cavity defined by adjacent lobes thereby tending to draw the selector knob and contact shifting part into proper index position.

The housing 302 and rotor may be formed of any suitable, relatively hard plastic, zinc, powdered metal, etc., and the leaf springs of a suitable spring steel. The ball detent may be of steel. The housing and rotor may be molded parts. Internally threaded metal inserts 362 and 364 may be received in the housing at the time of molding for receiving respectively the screws 212-214, and screws 120-122 by which the actuator and switch body assemblies are secured to the housing 302.

While only one ball detent 342 has been mentioned which is shiftable alternatively to either of the apertures 338 or 340, it should be understood that in some instances it may be desirable to use two such detents in the rotor to provide an even more positive "feel," or to increase the number of 30° detent positions. It will be apparent from a consideration of FIGS. 7 and 8 that by using two ball detents, twelve possible detent positions are attainable. One of the balls will at times ride the 60° lobes, but there will always be one of the balls riding a 30° lobe. Of course it would be necessary to remove all of the stop tabs 348 to obtain 360° rotation of the rotor.

What is claimed is:

1. Positioning mechanism for a rotary electric switch comprising: a housing, a primary rotor in the housing for positioning a rotary part of the switch, a secondary rotor in the housing coaxial with the primary rotor, a lost motion coupling connecting said rotors and allowing limited independent rotary motion therebetween, and spring means connected to the housing and to the secondary rotor for returning the rotors in at least one direction to the limit of their independent angular travel when the primary rotor has been turned beyond such limit.

2. Positioning mechanism for a rotary electric switch comprising: a housing, a primary rotor in the housing for positioning a rotary part of the switch, a pair of secondary rotors in the housing coaxial with the primary rotor, lost motion coupling means between the secondary rotors and the primary rotor allowing limited independent rotary motion therebetween, and spring means connected to the housing and to each secondary rotor for returning the primary rotor to the limits of its independent angular travel when it has been rotated beyond such limits in either direction.

3. The invention of claim 2 characterized in that the spring means is connected to said secondary rotors to bias them in opposite directions of angular travel.

4. The invention of claim 2 characterized in that stop means is provided on at least one of said secondary rotors cooperable with the housing to limit rotation of such rotor.

5. Positioning mechanism for a rotary electric switch comprising: housing means, a plurality of coaxial rotors in the housing means, said housing means provided with a plurality of radially inwardly extending lobes arranged circumferentially about one of said rotors, a spring loaded detent on such rotor biased radially outwardly toward and cooperating with said lobes, such rotor cooperable with a rotary part of the switch to rotate therewith, a lost motion coupling connected between a pair of the rotors and allowing limited independent rotary motion therebetween with one rotor of the pair cooperable with a rotary part of the switch for rotation therewith and the other rotatable independently of such part, spring means connected to the housing means and to the last mentioned rotor for returning said pair in at least one direction to the limit of their independent angular travel when the first mentioned rotor of the pair has been turned beyond such limit.

6. Positioning mechanism for a rotary electric switch, comprising: a stationary housing, a rotor in the housing for positioning a rotatable part of the switch, said housing provided with a plurality of radially inwardly extending lobes arranged circumferentially about the periphery of the rotor, all of said lobes but two being of equal arc length and said two being adjacent each other and each having an arc length twice that of the other lobes, a pair of angularly spaced apart detent supporting means at the periphery of the rotor for supporting spring loaded detents at either or both of the spaced locations, spring loaded detents for support by said supporting means and cooperable with the lobes to provide a variety of rotated positions for the rotor, stop means on the housing, and a plurality of removable tabs on the rotor disposed in outwardly extending radially spaced locations to cooperate with the stop means for limiting rotation of the rotor and selectively removable to alter the limits of rotor rotation.

References Cited

UNITED STATES PATENTS

| 3,177,306 | 4/1965 | Mastney | 200—14 XR |
| 3,188,881 | 6/1965 | Pusch | 200—155 XR |
| 2,980,770 | 4/1961 | Nabstedt. | |
| 3,298,244 | 1/1967 | Durand et al. | 74—504 |

FOREIGN PATENTS

| 737,663 | 9/1955 | Great Britain. |
| 1,226,479 | 2/1960 | France. |
| 1,018,357 | 1/1966 | Great Britain. |

ROBERT K. SCHAEFER, Primary Examiner

R. A. VANDERHYE, Assistant Examiner

U.S. Cl. X.R.

74—504, 527; 200—153, 166